(12) United States Patent
Hsu

(10) Patent No.: US 6,850,927 B1
(45) Date of Patent: Feb. 1, 2005

(54) EVALUATING QUERIES WITH OUTER JOINS BY CATEGORIZING AND PROCESSING COMBINATIONS OF RELATIONSHIPS BETWEEN TABLE RECORDS

(75) Inventor: Edward Hsu, Redwood Shores, CA (US)

(73) Assignee: Oracle International Corporation, Redwood Shores, CA (US)

(*) Notice: Subject to any disclaimer, the term of this patent is extended or adjusted under 35 U.S.C. 154(b) by 450 days.

(21) Appl. No.: 10/153,094

(22) Filed: May 21, 2002

(51) Int. Cl.[7] .............................................. G06F 17/30
(52) U.S. Cl. ................................. 707/2; 707/4; 707/6
(58) Field of Search .................................. 707/2, 4, 6

(56) References Cited

U.S. PATENT DOCUMENTS

| | | | |
|---|---|---|---|
| 6,385,603 B1 * | 5/2002 | Chen et al. ................... 707/3 |
| 2003/0088558 A1 * | 5/2003 | Zaharioudakis et al. ....... 707/3 |
| 2003/0120682 A1 * | 6/2003 | Bestgen et al. ........... 707/104.1 |

OTHER PUBLICATIONS

Colin L. McMaster, "An Analysis of Algorithms for the Dutch National Flag Problem", Oct. 1978, vol. 21 No. 10, pag 842–846.*

* cited by examiner

*Primary Examiner*—Safet Metjahic
*Assistant Examiner*—CamLinh Nguyen
(74) *Attorney, Agent, or Firm*—Hickman Palermo Truong & Becker LLP; John D. Henkhaus

(57) ABSTRACT

Aspects of the invention provide methods for rewriting and computing database queries that include outer join conditions, and for determining columns that satisfy a criteria. According to one aspect, a component relation key is assigned to each unique column in a first table and an aggregate relation key is generated for each record in a second table, wherein the aggregate relation key is based on one or more of the component relation keys corresponding to columns with non-null values from the second table. Distinct aggregate relation keys are determined, and an original query with an outer join is rewritten into at least a number of sub-queries equal to the number of distinct aggregate keys, wherein each sub-query includes a join condition based on each column represented by the respective distinct aggregate keys. Significantly, the combination of sub-queries is logically equivalent to the original query, but does not include outer join conditions. Therefore, a more efficient query is provided.

31 Claims, 6 Drawing Sheets

TRANSACTION — 300, 302

| X_ID | A1 | A2 | A3 | A4 | ... | Am |
|---|---|---|---|---|---|---|
| X1 | CA | <$1M | TECHNICAL | ENGLISH | | |
| X2 | NV | <$1M | FINANCE | SPANISH | | |
| X3 | CA | >$1M | TECHNICAL | ENGLISH | | |
| . | | | | | | |
| . | | | | | | |
| Xn | | | | | | |

304

Q1: CUSTOMER STATE
Q2: ACCOUNT $ AMOUNT
Q3: TRANSACTION TYPE
Q4: LANGUAGE

FIG. 3A

TERRITORIES — 310, 312

| T_ID | Q1 | Q2 | Q3 | Q4 | ... | Qy |
|---|---|---|---|---|---|---|
| T1 | CA | >$1M | TECHNICAL | ENGLISH | | |
| T2 | CA | $1M>Q>$100K | | SPANISH | | |
| T3 | TX | <$100K | FINANCE | | | |
| T4 | NV | >$1M | | ENGLISH | | |
| . | | | | | | |
| . | | | | | | |
| Tx | | | | | | |

314

Q1: CUSTOMER STATE
Q2: ACCOUNT $ AMOUNT
Q3: TRANSACTION TYPE
Q4: LANGUAGE

FIG. 3B

KEYS

| T_ID | Q1 | Q2 | Q3 | Q4 | ... | Qy | AGGREGATE RELATION KEY |
|---|---|---|---|---|---|---|---|
| T1 | CA | > $1M | TECHNICAL | ENGLISH | . . . | | 210 |
| T2 | CA | $1M>Q>$100K | FINANCE | SPANISH | | | 42 |
| T3 | TX | <$100K | | ENGLISH | | | 30 |
| T4 | NV | > $1M | | | | | 42 |
| . | | | | | | | |
| Tx | | | | | | Py | |
| COMPONENT RELATION KEY | 2 | 3 | 5 | 7 | | | |

FIG. 4

EVALUATING QUERIES WITH OUTER JOINS BY CATEGORIZING AND PROCESSING COMBINATIONS OF RELATIONSHIPS BETWEEN TABLE RECORDS

FIELD OF THE INVENTION

The present invention relates generally to database management systems and, more specifically, to techniques for managing combinations of relationships between table records to efficiently evaluate queries with outer joins.

BACKGROUND OF THE INVENTION

Database management systems retrieve information in response to receiving queries that specify the information to retrieve. In order for a database management system to understand the query, the query should conform to a database language recognized by the database management system, such as the Structured Query Language (SQL).

Join Condition

A join is performed whenever multiple tables appear in a query's FROM clause. The query's select list can select any columns from any of the base tables listed in the FROM clause. Most join queries contain WHERE clause conditions that compare two columns, each from a different table. Such a condition is called a join condition. To execute a join, the DBMS combines pairs of rows for which the join condition evaluates to TRUE, where each pair contains one row from each table.

To execute a join of three or more tables, the DBMS first joins two of the tables based on the join conditions comparing their columns and then joins the result to another table based on join conditions containing columns of the joined tables and the other table. The DBMS continues this process until all tables are joined into the result.

In addition to join conditions, the WHERE clause of a join query can also contain other conditions that refer to columns of only one table. These conditions can further restrict the rows returned by the join query.

An equijoin is a join with a join condition containing an equality operator. An equijoin combines rows that have equivalent values for the specified columns. The following query is an equijoin that combines the rows of tables R and S where the value in column r.a is the same as the value in column s.a:

SELECT *
FROM R, S
WHERE r.a=s.a;

In this example, table R is the "left" or "child" side table of the join, and table S is the "right" or "parent" table of the join. The join illustrated by Queryl is a "simple" or "inner" join. With an inner join, rows from the child table that do not satisfy the join condition are not reflected in the join result.

In contrast, an outer join returns all child rows that satisfy the join condition and those rows from the child table for which no rows from the parent satisfy the join condition. Outer joins are computationally expensive operations, but often logically necessary. Furthermore, the computational expense of an outer join is relative to the number of columns in the joined tables and to the number of records in the joined tables. Thus, tables with many columns and many records are more expensive to process than are smaller tables.

In some contexts, the number of columns in a table can exceed one hundred and the number of records can be in the millions. In addition, many of the records in a table may not have values for a vast majority of the columns. Hence, in prior approaches, when joining such tables many columns of many records are processed unnecessarily during the processing of join conditions, especially outer join conditions.

Table Relationships

A table has a one-to-one relationship with another table when one row in the table can only be related to one row in the other table. A table has a one-to-many relationship with another table when a row in the table can be related to multiple rows in the other table. A table has a many-to-many relationship with another table when multiple rows in the table may be related to multiple rows in the other table.

A third table may be used to establish a many-to-many relationship between tables. The relational conditions defining the relationship are based on columns in the three tables. Column values in a row of the third table establish relationships between rows of one table and rows of another table.

In prior approaches, when outer joining tables with a many-to-many relationship, many combinations of columns are processed unnecessarily. The related computational expense is partially due to the lack of knowledge about the relationships of various records in the tables.

Customer Relationship Management

One function of a Customer Relationship Management (CRM) application is to match incoming requests with defined rules and their related resources. That is, in a customer service context, a back-end application is available to analyze incoming customer requests, map them to requestor information, and route the requests to the appropriate service resource, or personnel, based on certain parameters in the respective requestor information. The routing decisions are made based on defined rules, which include sets of conditions on qualifiers that are associated with attribute information that might be present in the customer request. The parameters in the requestor information are referred to as attributes of the request. Thus, request attributes are compared to respective qualifiers of the various conditions of the set of conditions that define respective rules, to determine proper assignment of resources for a given request. In an example implementation, the rules (i.e., one or more conditions) are referred to as Territories, which assist in assigning incoming customer Transactions (consisting of attributes that represent the state of the request) to appropriate resources.

For example, Territory 1 may include the following set of conditions:
State=CA; and
Acct>$1M;
Resource=Bill.
Territory 2 may include the following set of conditions:
State=NV;
Acct>$1M; and
Transaction Type=Technical;
Resource=Jane.
Furthermore, a request (sometimes referred to as a "Transaction") is made from a customer with the following attributes, which generally represent the state of the Transaction, in combination with account information:
Customer=Company A;
State=CA;
Acct=$1.1M; and
Transaction=Technical.
Generally, a CRM system would analyze the Transaction information attributes by comparing them to the sets of conditions and determining which Territory the request falls within, and route the request to the associated person or other resource to service the request. In this example, the State qualifier is used in the definition of Territory 1, the Acct qualifier is used in the definition of both Territories, and the Transaction qualifier is used in the definition of both Territories (since Territory 1 has no Transaction specified, it is considered to encompass all values for Transaction, thus all Transactions meet Territory 1 's Transaction condition). Hence, Company A's request would get routed to the appropriate Resource for servicing, i.e., Bill.

In a prior approach, the aforementioned process is embodied in software code in which the conditions are explicitly defined and the logic utilizes a long series of "if-then" statements and "or" condition conjunctions. One problem with this approach is the large number of "if-then" statements that are required to apply the logic with respect to the many combinations of conditions for many Territories. Therefore, this approach is computationally inefficient and slow.

In practice, customers may implement a CRM system that includes hundreds of potential qualifiers that may be constituent to many Territory definitions (or similarly functioning sets of conditions). Another prior approach to assigning the incoming requests is to create a table of records representing Transactions, wherein the table has a column for each attribute associated with any of the Transactions, and to create a table of records representing Territories, wherein the table has a record for each Territory and a column for each qualifier condition associated with any of the Territories. Hence, a table of all Transactions and a table of all Territories will have at least as many columns as there are qualifiers associated with the Territories. In order to process each Transaction, the tables are joined and GROUP BY statements used to determine the number of conditions, for each Territory, that are met by each of the Transactions. The Territory in which the most conditions are satisfied is assigned the Transaction. This approach is table driven, in contrast to the previously described approach, but it assigns each transaction one at a time. Again, this approach is computationally inefficient.

A major challenge for such a system arises when joins of the Transactions table and the Territories table occur. With many potential qualifiers that may be used to perform this join, outer join conditions become extremely frequent when assigning Territories to incoming Transactions. Furthermore, outer join conditions require a full table scan, which is to be avoided. In this scenario, if a Transaction's attributes satisfy all of the qualifier conditions of a given Territory, the Territory is assigned even if the associated conditions are but a subset of the Transaction's attributes. With the vast amount of data (e.g., qualifiers and Territories) that such a system is required to process, outer joins become extremely expensive, but logically necessary.

Based on the foregoing, it is clearly desirable to provide a mechanism for managing relationships between columns and records of multiple tables. There is a more specific need for a mechanism to efficiently perform outer join conditions on tables with a large number of column and with a large number of records.

SUMMARY OF THE INVENTION

Methods are provided for evaluating database queries with outer joins by categorizing and processing combinations of relationships between table records.

According to one aspect, a method is provided for rewriting a database query that includes an outer join condition among multiple tables into a query without an outer join condition, thereby generating a more computationally efficient query.

In one embodiment, a unique key is assigned to each unique column in a first table and an aggregate key is generated for each record in a second table, wherein the aggregate key is based on one or more of the unique keys corresponding to columns with non-null values from the second table. Distinct aggregate keys are determined, and an original query with an outer join is rewritten into at least a number of sub-queries equal to the number of distinct aggregate keys, wherein each sub-query includes a join condition based on each column represented by the respective distinct aggregate keys. In one embodiment, the keys are assigned as prime numbers. In a related embodiment, the aggregate keys are based on the product of the keys.

According to one aspect, a method is provided for computing a query with an outer join condition.

In one embodiment, first records from a first table having first qualifiers representing respective conditions associated with one or more first records, are accessed; and second records from a second table having second qualifiers representing respective second records, are accessed. Each second qualifier with a non-null value associated with each second record provides a value for comparison with one or more conditions associated with one or more first records. Further, a unique key, or identifier, is created for each condition and an aggregate key is created for each of the first records, which is based on the keys corresponding to the conditions associated with each first record.

Distinct aggregate keys are determined which identify a relationship between first records and their corresponding conditions. An original query with an outer join of the first and second tables is rewritten into at least a number of subqueries equal to the number of distinct aggregate keys, wherein each sub-query includes a join of the first and second tables corresponding to and based on each condition corresponding to the first records associated with the respective distinct aggregate keys.

According to one aspect, a method is provided for determining columns from a record that satisfy a criteria. In one embodiment, an aggregate key associated with a record is read, wherein the aggregate key is based on keys that each identify a column satisfying the criteria. Then, for two or more keys from a plurality of keys that identify a column, a modulus function is applied to the aggregate key and respective keys until zero is returned. The aggregate key is divided by the determined key to yield an intermediate key. The steps of applying a modulus function and dividing the newly determined intermediate key by the newly determined key is repeated until all constituent keys are determined for the given aggregate key. Columns that meet the criteria are then determined by determining the respective columns that are associated with each of the pertinent keys determined in previous steps.

Various implementations of the techniques described are embodied in methods, in computer-readable media, and in apparatus.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is an example table used to illustrate the process depicted in FIG. 2;

FIG. 3B is an example table used to illustrate the process depicted in FIG. 2;

FIG. 4 is an example table used to illustrate the process depicted in FIG. 2;

DETAILED DESCRIPTION

A method and system are described for efficiently evaluating database queries with outer joins by categorizing and processing relationships between table records. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Throughout this specification, the description will use the Transaction/Territory assignment scenario from the Background section to provide context. However, the techniques described herein are not limited to this context, for they apply at least to all queries with outer join conditions of multiple tables.

Process for Rewriting a Query that Includes an Outer Join

Figure 1:
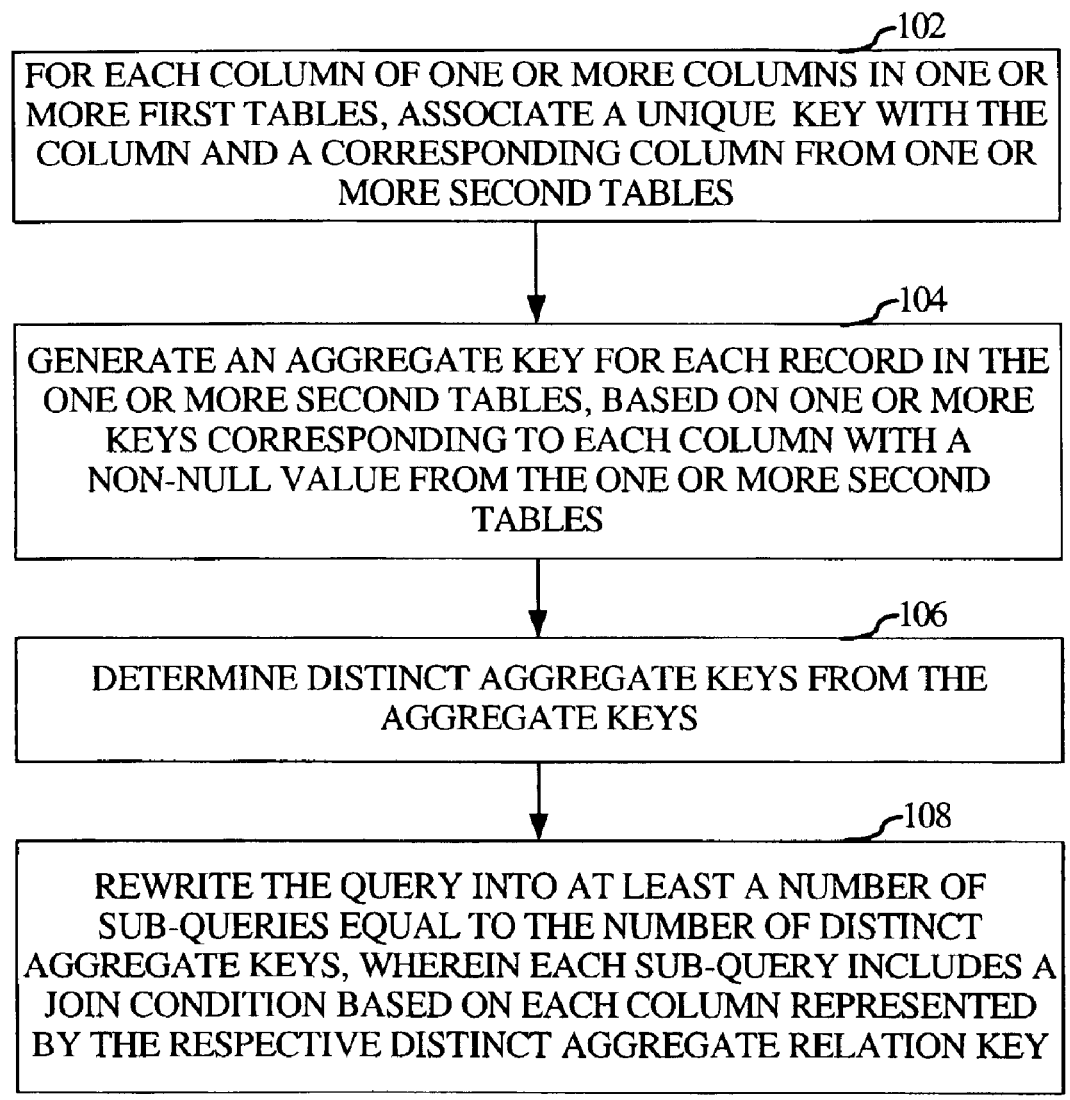
FIG. 1 is a flowchart illustrating a process for rewriting a database query that includes one or more outer join conditions of first and second tables into a query without an outer join condition, according to an embodiment of the invention.

FIG. 1 is a flowchart illustrating a process for rewriting a database query that includes one or more outer join conditions of first and second tables into a query without an outer join condition, according to an embodiment of the invention. Consequently, the resultant query is more computationally efficient than the original query.

At block 102, for each column of one or more columns in one or more first tables, a unique component relation key is associated with the column and a corresponding column from one or more second tables. In one embodiment, prime numbers are used to implement the component relation keys. Thus, each relevant column of the first table and the corresponding column in the second table is assigned a unique prime number. Note that only two tables are used herein to exemplify the process depicted in FIG. 1, but that the process is also applicable to a query that has multiple outer joins and that joins more than two tables.

At block 104, an aggregate relation key is generated for each record in the one or more second tables. The aggregate relation key is based on one or more component relation keys that correspond to each column in the second table that has a non-null value. Returning to the prime number embodiment, the aggregate relation key is computed as the product of the component relation keys, i.e., the prime numbers assigned to each of the columns. Consequently, as a result of the inherent property of a prime number, that is, that its only positive divisors are one and itself, each aggregate relation key is decomposable back into its constituent component relation keys.

At block 106, distinct aggregate relation keys are determined from the aggregate relation keys. In other words, the aggregate relation keys are analyzed to determine how many distinct keys are present. Each distinct aggregate key represents a set of records that each has a non-null value in specific columns. Hence, for example, in the context of the Transaction/Territory assignment scenario, each distinct aggregate key represents the set of Territories that include specific conditions associated with the qualifiers (or columns) represented by the component relation keys constituent to the respective aggregate relation keys.

Finally, at block 108, the original query that includes at least one outer join condition is rewritten into a number of sub-queries, whereby the number of subqueries is at least the number of distinct aggregate keys. In one embodiment, the subqueries are combined into a single query, for example, with a UNION of the sub-queries. Furthermore, each sub-query includes a join condition based on each column represented by the respective distinct aggregate relation key. Resultantly, the original query with the outer join is rewritten to a logical equivalent that does not include an outer join. For example, without limitation, the sub-queries may include WHERE clauses that specify an equijoin. Significantly, a pruned query that combines the sub-queries can be computed in a more computationally efficient manner than the original query, thereby reducing the amount of computing resources required to compute a result set for the original query. In this context, a pruned query is a query that results from the process described, which prunes the set of all possible combinations of columns from the original query into a query that includes only the pertinent combinations of columns, i.e., the columns that have non-null values. Thus, extraneous and unnecessary processing is avoided.

In one embodiment, an index is constructed based on the aggregate relation keys. That is, an index is constructed for the minimum number of combinations of columns, as represented by the set of aggregate relation keys. This index collectively and exhaustively references the columns represented by the component relation keys, thus avoiding the indexing of columns with null values.

In one embodiment, comparing respective aggregate relation keys of multiple records is performed to determine whether one record is a subset of another record. For example, if the aggregate relation key of a first record is divisible, without a remainder, into an aggregate relation key of a second record, that means that the first record is a subset of the second record. That is, all of the non-null columns in the first record are present as non-null columns in the second record.

In one embodiment, the component relation keys of a first table are compared with the aggregate relation keys of a second table, to determine whether there is a record from the first table that will join with a record from the second table, in one of the sub-queries, according to the process described. The aggregate relation keys of one table (e.g., the second table) stores information about another table (e.g., the first table) that contains records with corresponding columns having non-null values, i.e., through the component relation keys of the first table. Hence, tests can be performed to determine whether records exist with corresponding columns having non-null values, in multiple tables, through use of the respective component and aggregate relation keys. This type of information is advantageous to at least a query optimizer program, which generates an optimized query execution plan for a given query.

Furthermore, in one embodiment, it is determined whether there is a record from a second table that will join with a record from a first table via a join between the first table and a third table according to the process described, without accessing the third table. This determination is made based on a comparison of the aggregate relation keys of the first table and the component relation keys of the second table, or vice versa. The benefit provided is that it allows tests to be performed for the existence of related records in tables two joins away before an actual join is performed on the particular column.

For example, given a query that requires joining table (or view) A to table B and joining the resultant table to table C, and given that the processing performance of the table B is extremely slow, one might want to determine whether there exists a row in table C that joins to a row in table A via table B. Due to the performance issues with table B, avoidance of table B is desired. Hence, the component relation keys of table C are compared to the aggregate relation keys of table A to look ahead in the process, in order to determine whether processing of table B is necessary or whether it can be avoided. In one embodiment, the component and aggregate keys are maintained in their respective tables A, B, and C. In an another embodiment, the component and aggregate keys for tables A, B, and C are maintained in a separate table, i.e., a table different than tables A, B, or C.

Computing a Query with Outer Join Condition

A process is provided for computing a query that includes one or more outer join conditions. This aspect is described in the context of the Transaction/Territory assignment implementation previously referenced, but is not limited to that implementation.

Recall that Territories include sets of conditions based on qualifiers that are each associated with an attribute that might be present in customer Transaction information, and that the customer Transaction information includes values for attributes, which represent the state of the Transaction. Thus, each Transaction information needs to be compared to the conditions that make up the rules for any given Territory to determine whether the Transaction information meets any of the conditions defined for any of the Territories, and if so, to what extent. Resultantly, Transactions are assigned to Territories based on these comparisons, which are typically implemented by joining a Transaction table that contains records of Transaction information with a Territories table that contains records of Territories, wherein both tables include similar columns representing the attributes/qualifiers that are part of the Transaction information and the Territories information. An outer join of the Transaction and Territories tables is the typical mechanism for determining which Territory conditions are met by which Transaction attributes because, given no knowledge of the actual data, an exhaustive analysis of all the Territories conditions should be performed for Transaction assignment purposes.

Figure 2:
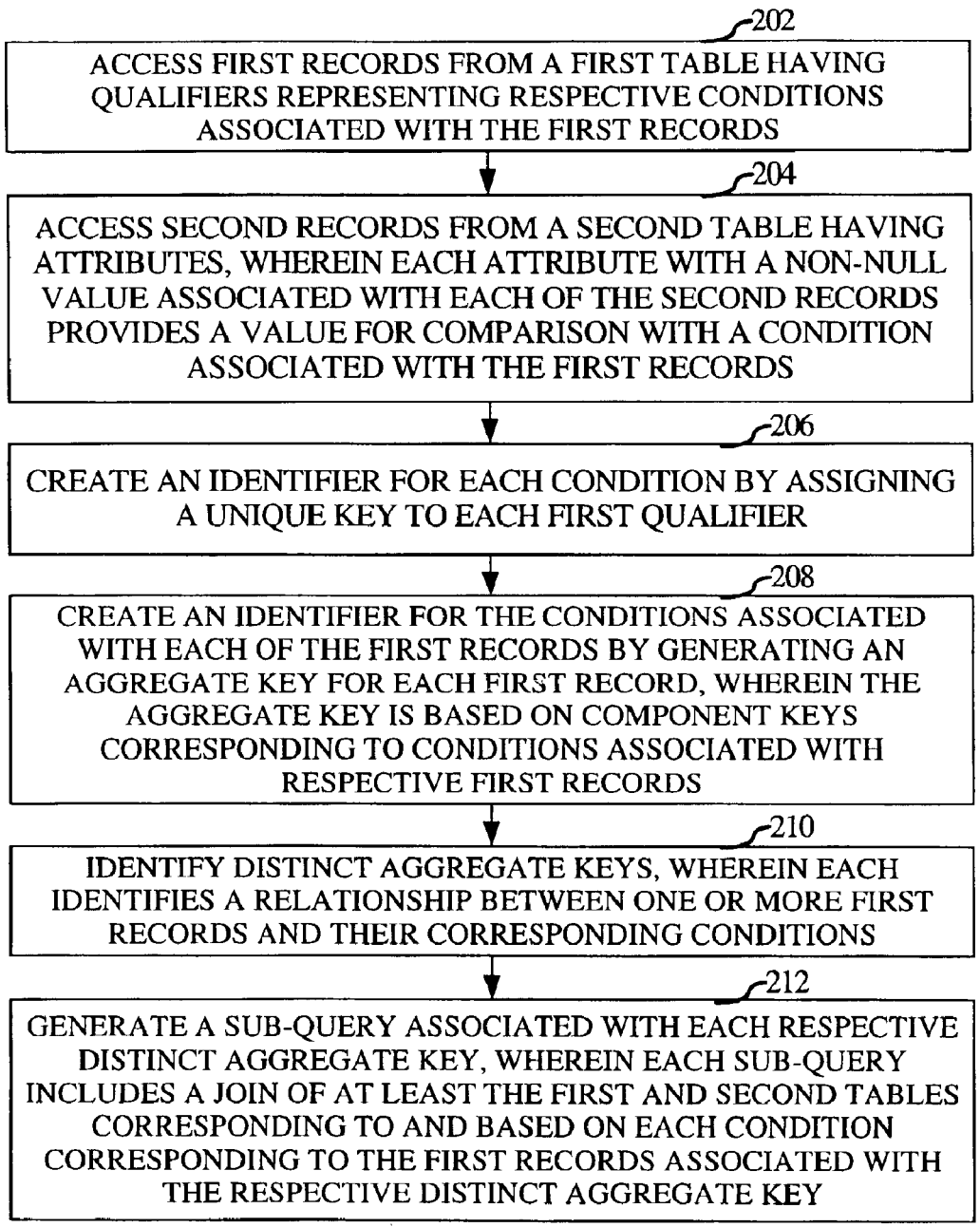
FIG. 2 is a flowchart illustrating a process for computing a query with one or more outer join conditions, according to an embodiment of the invention.

FIG. 2 is a flowchart illustrating a process for computing a query with one or more outer join conditions, according to an embodiment of the invention. FIGS. 3A, 3B, and 4 are example tables used to illustrate the process depicted in FIG. 2.

At block 202, first records from a first table are accessed, wherein the first table has qualifiers (i.e., columns) representing respective conditions associated with the first records. For example, without limitation, the first table is a Territories table 310 as depicted in FIG. 3B. Territories table 310 has a record-identifying column 312 (T_ID), which identifies the Territories. The remaining columns, Q1–Qy, are first qualifiers 314, which are constituent to the conditions that define the rules for a particular Territory. Reference to the record identified as T1 (T_ID) in column 312 shows that it is defined by a rule consisting of four conditions, each based on a qualifier, as follows:

Q1=Customer State=CA;
Q2=Account $ Amount=>$1M;
Q3=Transaction Type=Technical; and
Q4=Language=English.

Hence, a transaction that meets those conditions is assigned to a resource associated with Territory T1. Note, for example, that an additional column in the Territory table may identify the resources associated with each Territory, or may include a reference to another location (e.g., another table or a location on disk) where the associated resource is identified. As previously noted, implementations such as this example can include tables with many qualifiers. For example, different users might use different qualifiers, and may even use different qualifiers for different groups within the user's organization or for different product lines. It is noteworthy that a current implementation includes over one hundred different qualifiers that are used to define the Territories. Other implementations may include even more qualifiers, which amplifies the magnitude of computing the table outer join condition specified in the original query.

At block 204, second records from a second table are accessed, wherein each qualifier, i.e., attribute, with a non-null value associated with each of the second records provides a value for comparison with conditions associated with the first records. For example, without limitation, the second table is a Transaction table 300 as depicted in FIG. 3A. Transaction table 300 has a record-identifying column 302 (X_ID), which identifies the Transactions (e.g., account number). The remaining columns, A1–Am, are attributes 304 that represent the state of a given Transaction. Reference to the record identified as X3 (X_ID) in column 302 shows that it is in a state consisting of four attributes, as follows:

A1=Customer State=CA;
A2=Account $ Amount=>$1M;
A3=Transaction Type=Technical; and
A4=Language=English.

For a Territory assignment application, the Transaction attributes are used for comparing with the Territories. Thus, a query can be written that includes an outer join condition that joins the Transaction table with the Territories table. An outer join of these two tables will return all of the records of the Territories table regardless of whether or not they meet the outer join condition, but information associated with a given record from the Transaction table is only returned if the given record meets the outer join condition. The foregoing process, i.e., the use of an outer join, describes a prior process that does not necessarily utilize the present invention. The invention described herein can be used to rewrite a given query that includes an outer join condition (such as the query described immediately preceding), or can generate a combination of sub-queries given a desired join of tables. In other words, a step of writing an original query that includes an outer join condition, so that embodiments of the invention can rewrite the original query into a combination of sub-queries, is not a required step of the invention. The invention logically processes tables as if a query with an outer join condition exists, however, a query that includes an outer join condition need not actually exist in order to remain within the scope of the invention.

At block 206, an identifier for each condition is created by assigning a unique component relation key to each qualifier.

For example, a unique identifier is created for each qualifier (e.g., columns Q1–Qy) present in the Territories table. Note that a one-to-one mapping of Transaction attributes to Territory qualifiers may exist, however, one table may include attributes/qualifiers that are not present in the other table.

In one embodiment, a unique prime number is used to identify each qualifier, that is, prime numbers are used for the component relation keys. However, the invention is not limited to use of prime numbers as component relation keys. For example, binary numbers could also be used. Those skilled in the art may implement other variations of component relation keys, and still fall within the scope of the invention.

FIG. 4 is a Keys table 400, illustrating a modified version of the Territories table 310, which includes a component relation key row 402 and an aggregate relation key column 404. Again, in one embodiment, a unique prime number is used to identify each qualifier, that is, prime numbers are used for the component relation keys. This embodiment is illustrated by component relation key row 402, which shows prime numbers 2 through Py, with each associated with a qualifier. Note that creation of the Keys table is not a required step of the process, but is provided for illustrative purposes.

Once identifiers (e.g., component relation keys) have been created for each qualifier from the first table (e.g., the Territories table) according to block 206, at block 208 an identifier for the conditions associated with each of the first records is created by generating an aggregate relation key for each first record. The aggregate relation keys are based on the component relation keys corresponding to the conditions associated with the respective first records, and uniquely identify the one or more qualifiers that are constituent to the conditions associated with each respective Territory.

In one embodiment in which the component relation keys are prime numbers, the aggregate relation keys are based on the product of the component relation keys. This embodiment is illustrated by aggregate relation key column 404 of FIG. 4. Thus, due to the inherent nature of prime numbers, the aggregate relation keys can be used to determine the component relation keys on which each aggregate relation key is based. Additionally, and significantly, the component relation keys on which each aggregate relation key is based provide information as to what qualifiers are being represented thereby.

Use of the component and aggregate relation keys provide a mechanism for determining what combinations of columns from one or more tables (e.g., Transactions table 300 of FIG. 3), out of all possible combinations, actually are pertinent, i.e., have non-null values. Consequently, processing of the columns with null values can be avoided. With respect to the example implementation, the component and aggregate relation keys are used to prune the set of all possible Transaction attribute/Territory condition combinations to a subset of pertinent combinations that are more efficient to work with. Hence, qualifiers that are not used in conditions for any given Territory rule are eliminated from processing for that Territory, thereby resulting in a more efficient computation.

For example, each Territory condition can have one of two states, e.g., condition met or not met. Therefore, the number of possible combinations of qualifier usages is dependent on the number of qualifiers. That is, given X qualifiers each having two possible states, the number of possible combinations of qualifier usages is $2^x$. Therefore, a scenario in which there are one hundred qualifiers that are used to define rules for Territories, or any other scenario in which a table with one hundred columns is present, there are $2^{100}$ possible combinations of columns. Performing a full table scan to process each of the possible combinations is not an efficient use of computing resources, thus, processing of only the pertinent, or actual, combinations is desired and is met by the present invention.

At block 210, distinct aggregate relation keys are identified. Each distinct aggregate relation key identifies a relationship between one or more first records and their corresponding conditions. That is, each distinct key collectively identifies first records (e.g., Territories) that include conditions based on specific qualifiers. Consequently, sub-queries can be written to address only the pertinent Territories, such as at block 212, where a sub-query for each respective distinct aggregate key is generated. Furthermore, each sub-query includes at least one join condition of at least the first and second tables, and each join condition corresponds to and is based on each condition corresponding to the first records associated with the respective distinct aggregate key. Hence, a sub-query is generated for each distinct aggregate key, and each sub-query includes a join condition for each qualifier that is represented by the respective distinct aggregate key.

In one embodiment, a final query is generated that includes a combination of the sub-queries generated at block 212, and which is a logical equivalent of the original query. For example, the final query may combine the sub-queries with a UNION operation. When the final query is computed, it produces the same results as would the original query, but uses significantly less computational resources.

In one embodiment, an index is constructed based on the aggregate relation keys. That is, an index is constructed for the minimum number of combinations of columns, as represented by the set of aggregate relation keys. This index collectively and exhaustively references the columns represented by the component relation keys, thus avoiding the indexing of columns with null values.

Furthermore, the techniques described herein allow a determination at algorithm (or process) run-time as to what indices should and should not be built, thereby optimizing the efficiency of an associated query.

The following description provides an example of this use. Assume a, b, c, d, ..., z are prime numbers. A goal is to determine on what columns to build indices, for the sub-queries that are generated for each of the aggregate keys (as described above) will use the indices when the sub-queries are executed. Suppose it is known that aggregate keys composed of the following component keys exist for a particular table, e.g., a given Territories table:

a,c,e,f;

a,c,e;

f,g; and c,e.

Indices are first built with the most selective columns. That is, the aggregate keys composed of more component keys are more selective than aggregate keys composed of fewer component keys. For example, aggregate key a,c,e,f is more selective than aggregate key a,c,e, which is more selective than aggregate key f,g. In the example, an index does not need to be built on aggregate key a,c,e because it is an ordinal subset (ordered by selectivity) of aggregate key a,c,e,f. Hence, any query that can utilize an index on a,c,e can also utilize an index on a,c,e,f in the same manner.

In one embodiment, comparing respective aggregate relation keys of multiple records is performed to determine whether one record is a subset of another record. For example, if the aggregate relation key of a first record is divisible into an aggregate relation key of a second record, that means that the first record is a subset of the second record in that all of the non-null columns in the first record are present as non-null columns in the second record. Hence, if an index is built for the second table on columns with non-null values, then it would be unnecessary to build an index for the first table on the non-null columns.

In one embodiment, the component relation keys of a first table are compared with the aggregate relation keys of a second table, to determine whether there is a record from the first table that will join with a record from the second table, in one of the sub-queries, according to the process described. The aggregate relation keys of one table (e.g., the second table) stores information about a table (e.g., the first table) that contain related records, i.e., through the component relation keys of the first table. Hence, tests can be performed to determine whether related records exist in multiple tables, through use of the respective component and aggregate relation keys. This type of information is advantageous to at least query optimizer program, which generates an optimized query execution plan for a given query.

Furthermore, in one embodiment, it is determined whether there is a record from a second table that will join with a record from a first table via a join between the first table and a third table, according to the process described, without accessing the third table. This determination is made based on a comparison of the aggregate relation keys of the first table and the component relation keys of the second table. The benefit provided is that it allows tests to be performed for the existence of related records in tables two joins away before an actual join is performed on the particular column.

In general, given a query with an outer join condition on multiple tables where at least one of the multiple tables has null values for some columns of some records, the aggregate relation keys are generated and utilized for the columns of the table with null values. Hence, the pruning capabilities offered by these techniques, i.e., pruning irrelevant columns or combinations of columns from an outer join of multiple tables, is realized.

Example—Rewriting a Query with Outer Joins

For example, suppose that the following query was written to match men with women, in an attempt to match people with similar preferences in life, e.g., number of children, favorite pet, and favorite TV program.

SELECT m.name, w.name
FROM men_all m, women_all w
WHERE m.desired_num_kids=w.desired_num_kids
and m.favorite_pet=w.favorite_pet(+)
and m.favorite_tv_show w.favorite_tv_show(+).

The hypothetical facts indicate that only some women have a preference of a favorite pet and only some women have a preference of a favorite TV program. Furthermore, knowing that all women have a preference in at least one qualifier other than desired_num_kids, for which they all have a preference, an outer join (indicated by the "+") of the favorite_pet and favorite_tv_show columns is performed. The outer join is performed because it is unknown which, if any, of favorite_pet and favorite_tv_show any woman has. Note that if a woman has a preference that is not matched by any man, an associated record is not returned for the woman for that preference.

One note about outer joins is that in some database management systems, a table may be outer-joined with at most one other table. Therefore, not only is an outer join (as presented in the query above) an inefficient operation, it is not possible if the women's preferences are in multiple tables. Hence, a logical equivalent of the foregoing query is desired.

Since three qualifiers are being compared, i.e., desired_num_kids, favorite_pet, and favorite_tv_show, the total possible number of combinations of these qualifiers (columns) is $2^3$=8. The underlying tables, women all and men all, are such that some of the eight combinations are not feasible. For example, assume that all women have at least one preference, therefore null values for all attributes is not possible. Analysis and processing of the table women_all, which has data with inherent qualities or limitation such as that exemplified above (i.e., that all women have at least one preference), according to the process for rewriting a query with an outer join condition (described above), reduces the eight possible column combinations to only the pertinent, or feasible, combinations. A resulting query is as follows:

SELECT m.name, w.name
FROM men_all.m, women_all.w
WHERE m.desired_num_kids=w.desired_num_kids
and m.favorite_pet=w.favorite_pet
UNION ALL
SELECT m.name, w.name
FROM men_all.m, women_all.w
WHERE m.desired_num_kids=w.desired_num_kids
and m.favorite_tv_show=w.favorite_tv_show
UNION ALL
SELECT m.name, w.name
FROM men_all.m, women_all.w
WHERE m.desired_num_kids=w.desired_num_kids.

The first sub-query returns records representing only the women who have a preference in pets and a preference for number of children, and which match with men with the same preferences. It will not return, nor will it process, records representing women without a preference in pets. Similarly, the second sub-query returns records representing only the women who have a preference in TV shows and a preference for number of children, and which match with men with the same preferences. It will not return, nor will it process, records representing women without a preference in TV shows. The third sub-query returns records representing women who only have a preference for number of children and which match with men having the same preference regarding the number of children.

In the preceding example, the process of FIG. 1 would identify three distinct aggregate relation keys, hence, there are three associated sub-queries. In addition, the distinct aggregate keys would identify the join conditions in each sub-query by decomposing the distinct aggregate relation keys into their respective component relation keys and by determining the corresponding qualifier (i.e., preference) associated with each component relation key. This resulting query, which includes a combination of sub-queries but no outer joins, is more computationally efficient than the original query because it only process the following column combinations: (1) number of children/favorite pet; (2) number or children/favorite TV show; and (3) number of children only. It does not process five possible combinations: (1) number of children/favorite pet/favorite TV show; (2) favorite pet/favorite TV show; (3) favorite TV show only; (4) favorite pet only: and (5) no preferences, because the table women_all shows that these combinations of columns have null values, which indicate no preference for that respective qualifier.

Process for Determining Columns that Satisfy a Criteria

Figure 5:
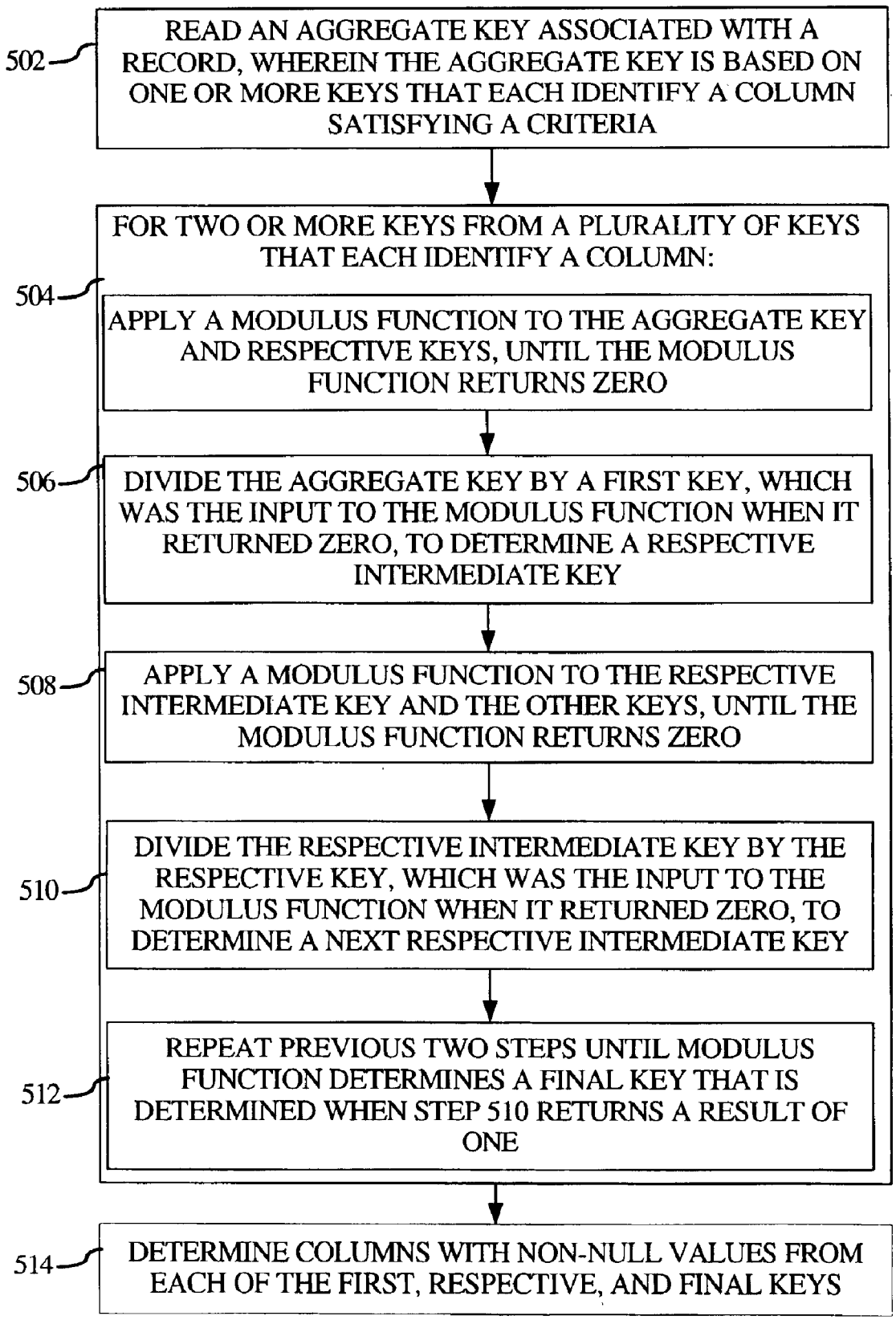
FIG. 5 is a flowchart illustrating a process for determining columns with non-null values for a data record, according to an embodiment of the invention.

FIG. 5 is a flowchart illustrating a process for determining columns from a record that satisfy a criteria, according to an embodiment of the invention. In describing the process of FIG. 5, component relation keys are represented as prime numbers and the aggregate relation key is represented as a product of prime numbers, according to an embodiment of the invention. However, the component and aggregate relation keys are not limited to representation as described, for another key mechanism may be implemented and still fall within the scope of the invention.

At block 502, an aggregate relation key associated with a table record is read, wherein the aggregate relation key is based on one or more keys that each identify a column satisfying the criteria. Then, for two or more component relation keys that each identify a column, at block 504 a modulus function is applied to the aggregate relation key and respective component relation keys, until the modulus function returns zero. That is, the aggregate relation key and a component relation key are input variables to the modulus function. A modulus function returns zero when one input variable is divisible by the other input variable, without a remainder. For example, given an aggregate relation key of 770, and cycling through prime number component relation keys, mod(770,2) returns zero because 770 is divisible by 2 without a remainder.

When the modulus function returns zero at block 504, the aggregate relation key is divided by the number (component relation key) that was an input variable to the modulus function when it returned zero (referred to at this point in the process as the first component relation key), thereby determining an intermediate component relation key, block 506. For example, 770 is divided by 2. The resulting quotient is 385, which is the intermediate component relation key at this stage of the process.

At block 508, a modulus function is applied to the intermediate component relation key and respective component relation keys, until the modulus function returns zero. That is, the current intermediate component relation key and a component relation key are input variables to the modulus function. For efficiency purposes, the prior component relation key can be left out of the modulus function application if the particular implementation allows. For example, if each unique column is assigned a unique prime number, once a prime number is identified as a component relation key, it will not be reused as another component relation key. Hence, once a component relation key is identified, it can be skipped in subsequent modulus functions. Returning to the example, mod(385,3) does not return zero, so mod(385,5) is executed. 385 is divisible by 5 without a remainder, thus the modulus function returns zero and 5 is the next pertinent component relation key.

At block 510, the respective intermediate component relation key is divided by the respective component relation key which was the input to the modulus function when it returned zero, thereby determining the next respective intermediate component relation key. For example, 385 is divided by 5 to yield 77, which is the intermediate component relation key at this stage of the process. At block 512, the previous two steps are repeated (blocks 508 and 510) until all component relation keys are determined, i.e., until a final component relation key is determined. The final component relation key is determined when block 510 returns a result of one, and thus, all component keys have been identified.

Continuing with the example, mod(77,7) returns zero, thus 7 is the next pertinent component relation key. So far, 2, 5, and 7 have been determined as component relation keys of the aggregate relation key 770. 770 is divided 7, resulting in a next intermediate component relation key of 11. Mod (11,11) returns zero, and 11 divided by 11 is 1. Therefore, 11 is the final component relation key, determined at block 512.

At block 514, columns with non-null values are determined based on all of the pertinent component relation keys that have been previously determined. That is, the first component relation key, the respective component relation keys, and the final component relation key. In the example, that would be 2, 5, 7, and 11. Since each component relation keys is associated with a column of the table, the component relation keys associated with the aggregate relation keys identify the columns that have non-null values. This is because the aggregate relation key was originally derived from the pertinent component relation keys associated with columns having non-null values for the given record. The process illustrated in FIG. 5 decomposes the aggregate relation key into its constituent component relation keys to identify the pertinent (non-null) columns.

Hardware Overview

Figure 6:
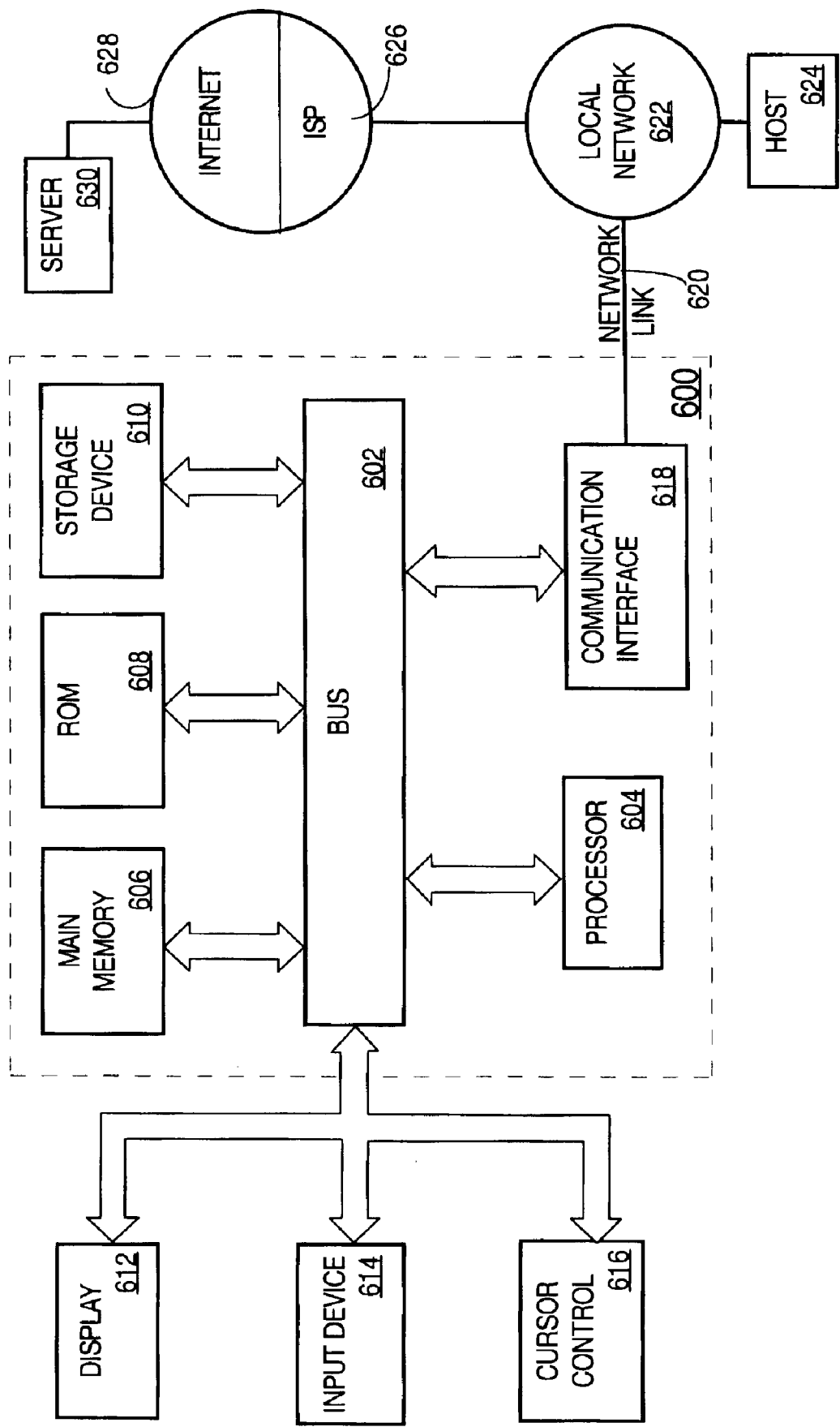
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, or magneto-optical disk, is provided and coupled to bus 602 for storing information and instructions.

Computer system 600 may be coupled via bus 602 to a display 612, such as a cathode ray tube (CRT) or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical, magnetic, or magneto-optical disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of, the invention. For example, references have been made to the SQL database query language and examples of queries using SQL have been utilized throughout to aid in describing the invention. However, the techniques described herein are not limited to any database query language. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for rewriting a database query that specifies at least one outer join between first and second tables, the method comprising:

for each column of one or more columns in one or more first tables, associating a unique key with the column and a corresponding column from one or more second tables;

generating an aggregate key for each record in the one or more second tables, the aggregate key being based on one or more keys corresponding to each column with a non-null value from the one or more second tables;

determining distinct aggregate keys from the aggregate keys generated for records in the one or more second tables;

rewriting the query into at least a number of sub-queries equal to the number of distinct aggregate keys determined, wherein each sub-query includes a join condition based on each column represented by respective distinct aggregate key.

2. The method of claim 1 wherein the step of associating a unique key with corresponding columns from the first and second tables is performed by associating each occurrence of corresponding columns from first and second tables with a different prime number.

3. The method of claim 2 wherein the step of generating an aggregate key is based on the product of the unique keys.

4. The method of claim 1 wherein the sub-queries are combined into a pruned query that is a logical equivalent of the query.

5. The method of claim 1 comprising:

constructing an index based on the aggregate keys.

6. The method of claim 1 comprising:

constructing an index based on the distinct aggregate keys.

7. The method of claim 1 comprising:

determining whether a first record is a subset of a second record by comparing respective aggregate keys.

8. The method of claim 1 comprising:

comparing the keys of a first table with the aggregate keys of a second table to determine whether there is a first record from the first table that will join in a sub-query with a second record from the second table.

9. The method of claim 1 comprising:

determining whether there is a second record from a second table that will join with a first record from a first table via a join between the first table and a third table, without accessing the third table, by performing steps that include comparing the keys of the second table with the aggregate keys of the first table.

10. A method for computing a query with one or more outer join conditions, the method comprising:

accessing first records from a first table having one or more qualifiers used to represent respective one or more conditions associated with one or more of the first records;

accessing second records from a second table having one or more attributes, wherein each attribute with a non-null value associated with each of the second records provides a value for comparison with a condition of the one or more conditions associated with one or more of the first records;

creating an identifier for each unique qualifier;

creating an identifier for the conditions associated with each of the first records by generating an aggregate key for each of the first records, wherein the aggregate key is based on identifiers corresponding to one or more qualifiers corresponding to the conditions associated with respective first records;

identifying distinct aggregate keys, wherein each distinct aggregate key identifies a relationship between one or more first records and their corresponding conditions; and generating a sub-query associated with each respective distinct aggregate key, wherein each sub-query includes a join of at least the first and second tables corresponding to and based on each condition corresponding to the one or more first records associated with the respective distinct aggregate key.

11. The method of claim 10 comprising:

generating a final query that includes a combination of the sub-queries and that is a logical equivalent of the original query; and computing the final query.

12. The method of claim 10 wherein the step of creating an identifier for each unique qualifier associates each unique qualifier with a respective key represented as a different prime number.

13. The method of claim 12 wherein the step of creating an identifier for the conditions associated with each of the first records creates aggregate keys based on the product of the keys.

14. The method of claim 10 comprising:

constructing an index based on the aggregate keys.

15. The method of claim 10 comprising:

comparing the keys of the first table with the aggregate keys of the second table to determine whether there is a first record from the first table that will join in a sub-query with a second record from the second table.

16. The method of claim 10 comprising:

determining whether there is a third record from a third table that will join with a first record from the first table via a join between the first table and the second table, without accessing the second table, by performing steps that include comparing the keys of the third table with the aggregate keys of the first table.

17. A method for determining columns from a record that satisfy a criteria, the method comprising:

(a) reading an aggregate key associated with the record, wherein the aggregate key is based on one or more keys that each identify a column satisfying the criteria;

(b) for two or more keys from a plurality of keys that each identify a column, (1) applying a modulus function to the aggregate key and respective unique keys, until the modulus function returns zero;

(2) dividing the aggregate key by a first key that was an input to the modulus function when the modulus function returned zero at step (1) to determine a respective intermediate key;

(3) applying a modulus function to the respective intermediate key and the other keys of the two or more unique keys, until the modulus function returns zero;

(4) dividing the respective intermediate key by the respective key that was an input to the modulus function when the modulus function returned zero at step (3) to determine a next respective intermediate key;

(5) repeat steps (3) and (4) until a final key is determined from the modulus function, wherein step (4) returns a result of one; and (c) determining columns that satisfy the criteria by determining respective columns identified by each of the first key, the respective intermediate keys, and the final key.

18. A computer-readable medium carrying one or more sequences of instructions for rewriting a database query that specifies at least one outer join between first and second tables, wherein execution of the one or more sequences of instructions by one or more processors causes the one or more processors to perform the steps of:

for each column of one or more columns in one or more first tables, associating a unique key with the column and a corresponding column from one or more second tables;

generating an aggregate key for each record in the one or more second tables, the aggregate key being based on one or more keys corresponding to each column with a non-null value from the one or more second tables;

determining distinct aggregate keys from the aggregate keys generated for records in the one or more second tables;

rewriting the query into at least a number of subqueries equal to the number of distinct aggregate keys determined, wherein each sub-query includes a join condition based on each column represented by respective distinct aggregate key.

19. The computer-readable medium of claim 18 wherein execution of the one or more sequences of instructions by one or more processors causes the one or more processors to perform the step of associating a unique key with corresponding columns from the first and second tables by associating each occurrence of corresponding columns from first and second tables with a different prime number.

20. The computer-readable medium of claim 19 wherein execution of the one or more sequences of instructions by one or more processors causes the one or more processors to perform the step of generating an aggregate key by generating an aggregate key based on the product of the unique keys.

21. The computer-readable medium of claim 18 wherein execution of the one or more sequences of instructions by one or more processors causes the one or more processors to perform the step of:

combining the sub-queries into a pruned query that is a logical equivalent of the query.

22. The computer-readable medium of claim 18 wherein execution of the one or more sequences of instructions by one or more processors causes the one or more processors to perform the step of:

constructing an index based on the aggregate keys.

23. The computer-readable medium of claim 18 wherein execution of the one or more sequences of instructions by one or more processors causes the one or more processors to perform the step of:
   constructing an index based on the distinct aggregate keys.

24. The computer-readable medium of claim 18 wherein execution of the one or more sequences of instructions by one or more processors causes the one or more processors to perform the step of:
   determining whether a first record is a subset of a second record by comparing respective aggregate keys.

25. The computer-readable medium of claim 18 wherein execution of the one or more sequences of instructions by one or more processors causes the one or more processors to perform the step of:
   comparing the keys of a first table with the aggregate keys of a second table to determine whether there is a first record from the first table that will join in a sub-query with a second record from the second table.

26. The computer-readable medium of claim 18 wherein execution of the one or more sequences of instructions by one or more processors causes the one or more processors to perform the step of:
   determining whether there is a second record from a second table that will join with a first record from a first table via a join between the first table and a third table, without accessing the third table, by performing steps that include comparing the keys of the second table with the aggregate keys of the first table.

27. A computer-readable medium carrying one or more sequences of instructions for computing a query with one or more outer join conditions, wherein execution of the one or more sequences of instructions by one or more processors causes the one or more processors to perform the steps of:
   accessing first records from a first table having one or more qualifiers used to represent respective one or more conditions associated with one or more of the first records;
   accessing second records from a second table having one or more attributes, wherein each attribute with a non-null value associated with each of the second records provides a value for comparison with a condition of the one or more conditions associated with one or more of the first records;
   creating an identifier for each unique qualifier;
   creating an identifier for the conditions associated with each of the first records by generating an aggregate key for each of the first records, wherein the aggregate key is based on identifiers corresponding to one or more qualifiers corresponding to the conditions associated with respective first records;
   identifying distinct aggregate keys, wherein each distinct aggregate key identifies a relationship between one or more first records and their corresponding conditions; and
   generating a sub-query associated with each respective distinct aggregate key, wherein each sub-query includes a join of at least the first and second tables corresponding to and based on each condition corresponding to the one or more first records associated with the respective distinct aggregate key.

28. A computer-readable medium carrying one or more sequences of instructions for determining columns from a record that satisfy a criteria, wherein execution of the one or more sequences of instructions by one or more processors causes the one or more processors to perform the steps of:
   (a) reading an aggregate key associated with the record, wherein the aggregate key is based on one or more keys that each identify a column satisfying the criteria;
   (b) for two or more keys from a plurality of keys that each identify a column,
      (1) applying a modulus function to the aggregate key and respective unique keys, until the modulus function returns zero;
      (2) dividing the aggregate key by a first key that was an input to the modulus function when the modulus function returned zero at step (1) to determine a respective intermediate key;
      (3) applying a modulus function to the respective intermediate key and the other keys of the two or more unique keys, until the modulus function returns zero;
      (4) dividing the respective intermediate key by the respective key that was an input to the modulus function when the modulus function returned zero at step (3) to determine a next respective intermediate key;
      (5) repeat steps (3) and (4) until a final key is determined from the modulus function, wherein step (4) returns a result of one; and
   (c) determining columns that satisfy the criteria by determining respective columns identified by each of the first key, the respective intermediate keys, and the final key.

29. A computer apparatus comprising:
   a memory; and
   one or more processors coupled to the memory and configured to execute one or more sequence of instructions for rewriting a database query that specifies at least one outer join between first and second tables, wherein execution of the one or more sequences of instructions by one or more processors causes the one or more processors to perform the steps of:
      for each column of one or more columns in one or more first tables, associating a unique key with the column and a corresponding column from one or more second tables;
      generating an aggregate key for each record in the one or more second tables, the aggregate key being based on one or more keys corresponding to each column with a non-null value from the one or more second tables;
      determining distinct aggregate keys from the aggregate keys generated for records in the one or more second tables;
      rewriting the query into at least a number of sub-queries equal to the number of distinct aggregate keys determined, wherein each sub-query includes a join condition based on each column represented by respective distinct aggregate key.

30. A computer apparatus comprising:
   a memory; and
   one or more processors coupled to the memory and configured to execute one or more sequence of instructions for computing a query with one or more outer join conditions, wherein execution of the one or more sequences of instructions by one or more processors causes the one or more processors to perform the steps of:
      accessing first records from a first table having one or more qualifiers used to represent respective one or more conditions associated with one or more of the first records;

accessing second records from a second table having one or more attributes, wherein each attribute with a non-null value associated with each of the second records provides a value for comparison with a condition of the one or more conditions associated with one or more of the first records;

creating an identifier for each unique qualifier;

creating an identifier for the conditions associated with each of the first records by generating an aggregate key for each of the first records, wherein the aggregate key is based on identifiers corresponding to one or more qualifiers corresponding to the conditions associated with respective first records;

identifying distinct aggregate keys, wherein each distinct aggregate key identifies a relationship between one or more first records and their corresponding conditions; and generating a sub-query associated with each respective distinct aggregate key, wherein each sub-query includes a join of at least the first and second tables corresponding to and based on each condition corresponding to the one or more first records associated with the respective distinct aggregate key.

31. A computer apparatus comprising:

a memory; and one or more processors coupled to the memory and configured to execute one or more sequence of instructions for determining columns from a record that satisfy a criteria, wherein execution of the one or more sequences of instructions by one or more processors causes the one or more processors to perform the steps of:

(a) reading an aggregate key associated with the record, wherein the aggregate key is based on one or more keys that each identify a column satisfying the criteria;

(b) for two or more keys from a plurality of keys that each identify a column,
   (1) applying a modulus function to the aggregate key and respective unique keys, until the modulus function returns zero;
   (2) dividing the aggregate key by a first key that was an input to the modulus function when the modulus function returned zero at step (1) to determine a respective intermediate key;
   (3) applying a modulus function to the respective intermediate key and the other keys of the two or more unique keys, until the modulus function returns zero;
   (4) dividing the respective intermediate key by the respective key that was an input to the modulus function when the modulus function returned zero at step (3) to determine a next respective intermediate key;
   (5) repeat steps (3) and (4) until a final key is determined from the modulus function, wherein step (4) returns a result of one; and (c) determining columns that satisfy the criteria by determining respective columns identified by each of the first key, the respective intermediate keys, and the final key.

* * * * *